(12) United States Patent
Ballas

(10) Patent No.: US 8,942,116 B2
(45) Date of Patent: Jan. 27, 2015

(54) ASYMMETRICAL LINK CONFIGURATION FOR INCREASED TOTAL NETWORK CAPACITY

(75) Inventor: Gur Ballas, Tel-Mond (IL)

(73) Assignee: Ceragon Networks Ltd., Tel-Aviv (IE)

( * ) Notice: Subject to any disclaimer, the term of this patent is extended or adjusted under 35 U.S.C. 154(b) by 535 days.

(21) Appl. No.: 13/245,907

(22) Filed: Sep. 27, 2011

(65) Prior Publication Data

US 2012/0076026 A1 Mar. 29, 2012

Related U.S. Application Data

(60) Provisional application No. 61/386,637, filed on Sep. 27, 2010.

(51) Int. Cl.
*H04L 12/24* (2006.01)
*H04L 5/00* (2006.01)
*H04L 1/00* (2006.01)
*H04W 72/04* (2009.01)
*H04W 72/08* (2009.01)

(52) U.S. Cl.
CPC .......... *H04L 41/0823* (2013.01); *H04L 5/0037* (2013.01); *H04L 5/0046* (2013.01); *H04L 5/0064* (2013.01); *H04L 1/0002* (2013.01); *H04W 72/0486* (2013.01); *H04W 72/082* (2013.01)
USPC ....................................... 370/252

(58) Field of Classification Search
CPC ... H04L 47/10; H04L 41/0823; H04L 1/0002; H04L 5/0064; H04L 5/0037; H04L 5/0046; H04W 24/00; H04W 88/06; H04W 28/18; H04W 72/082; H04W 72/0486
USPC .............. 370/229, 230, 230.1, 232, 233, 234, 370/235, 241, 252, 310, 328, 351, 389, 370/395.1, 395.2, 395.21, 395.4, 395.41; 455/422.1, 450, 452.1, 453
See application file for complete search history.

(56) References Cited

U.S. PATENT DOCUMENTS

| | | | |
|---|---|---|---|
| 6,016,311 A * | 1/2000 | Gilbert et al. | 370/280 |
| 6,175,550 B1 * | 1/2001 | van Nee | 370/206 |
| 2002/0085587 A1 * | 7/2002 | Mascolo | 370/477 |
| 2003/0003863 A1 * | 1/2003 | Thielecke et al. | 455/39 |
| 2003/0228850 A1 * | 12/2003 | Hwang | 455/101 |
| 2007/0133480 A1 * | 6/2007 | Nam et al. | 370/335 |
| 2008/0037679 A1 * | 2/2008 | Khan et al. | 375/267 |
| 2008/0045212 A1 * | 2/2008 | Kim et al. | 455/435.1 |
| 2010/0022284 A1 * | 1/2010 | Bergman et al. | 455/572 |
| 2010/0329379 A1 * | 12/2010 | Pham et al. | 375/267 |
| 2011/0153816 A1 * | 6/2011 | Lloyd et al. | 709/224 |

* cited by examiner

*Primary Examiner* — Obaidul Huq (57) ABSTRACT

A method for managing transmission settings in a wireless point-to-point link, including making a first estimate of a current required traffic capacity for transmitting in a first direction, from a first point in the wireless point-to-point link to a second point, and selecting a first technique for transmitting in the first direction, based, at least in part, on the first estimate of the current required traffic capacity, in which the first technique selected provides a traffic capacity which is less than a maximum capacity possible in the first direction. Related apparatus and methods are also described.

18 Claims, 10 Drawing Sheets

ASYMMETRICAL LINK CONFIGURATION FOR INCREASED TOTAL NETWORK CAPACITY

RELATED APPLICATIONS

This application claims the benefit of priority under 35 USC 119(e) of U.S. Provisional Patent Application No. 61/386,637 filed Sep. 27, 2010, the contents of which are incorporated herein by reference in their entirety.

FIELD AND BACKGROUND OF THE INVENTION

The present invention, in some embodiments thereof, relates to the field of wireless communication and, more specifically but not exclusively, to point-to-point communication systems and, yet more specifically but not exclusively, to single carrier continuous transmission point-to-point communication systems.

A non-limiting example of a point-to-point communication system can be a communication system such as employed by cellular backhaul networks or other wireless networks that use microwave and millimeter waves. These communication systems transmit continuously and are often required to provide a guaranteed quality of service. The quality of service may for example be measured in terms of delay, bit error-rate or frame error-rate. In order to guarantee a required quality, care must be taken in designing the network with respect to channel conditions and interference.

In order to minimize interference, high-gain antennas are used and the communication frequencies are regulated. Each point-to-point link in a network is assigned a pair of frequencies. The frequencies are known as an uplink (UL) frequency and a downlink (DL) frequency. One of the two nodes in the point-to-point link transmits using the UL frequency and the other transmits using the DL frequency. The bandwidth allocated to both nodes is identical.

Channel conditions may change over time, due to multi-path fading and/or rain attenuation. However, the channel conditions are typically the same for the uplink and the downlink, since the UL and the DL frequencies are relatively close. For example, the UL frequency may be 18 GHz and the DL frequency may be 18.5 GHz.

In case channel conditions deteriorate, and a receiver is unable to provide the required quality, a corresponding transmitter increases transmit power until the link reaches some predetermined quality level. If performance is still not good enough, it is common to switch the communication system to a mode, a different error code and/or a different modulation, which is more resistant to noise. In such a case the capacity provided by the link is typically reduced.

In QAM modulations, switching to a more noise resistant mode may mean using a smaller constellation, for example, switching from 64 QAM to 16 QAM or even to QPSK (4-QAM). Alternatively, switching an error-coding scheme may reduce sensitivity to noise and/or to channel deterioration, at the expense of bit rate.

To summarize, current systems are allocated equal-bandwidth channels for the uplink and downlink, and they may change the transmit power or the constellation in both uplink and downlink in the same fashion when dealing with fading in the wireless channel.

SUMMARY OF THE INVENTION

The current state of the art can be improved upon in cases in which a required uplink capacity is lower than a required downlink capacity, or vice versa. The current state of the art is symmetric with respect to the UL and DL. Both are allocated the same bandwidth and are designed to respond in a similar way to channel fading.

The present invention, in some embodiments thereof, includes modifying a transmit constellation, and/or transmit power, and/or a receiver's sensitivity, in an asymmetric fashion according to a required capacity in each direction of a point-to-point link. As is shown below, implementation of the above invention may reduce sensitivity to interference, such as in links which require low capacity, and enable increasing power and constellation in links which require high capacity. An overall effect is an increased total network capacity.

In the description of the present invention provided below, the invention is described, by way of a non-limiting example, with reference to ACM (Adaptive Coding and Modulation), by switching constellations, but it should be noted that the invention relates also to switching a coding scheme or both.

In the description of the present invention provided below, the invention is described, by way of a non-limiting example, with reference to wireless links which typically use single-carrier continuous transmission communication technology, but it should be noted that the invention should not be deemed limiting to such communication technology.

According to an aspect of some embodiments of the present invention there is provided a method for managing transmission settings in a wireless point-to-point link, including making a first estimate of a current required traffic capacity for transmitting in a first direction, from a first point in the wireless point-to-point link to a second point, and selecting a first technique for transmitting in the first direction, based, at least in part, on the first estimate of the current required traffic capacity, in which the first technique selected provides a traffic capacity which is less than a maximum capacity possible in the first direction.

According to some embodiments of the invention, further including making a first estimate of a current maximal capacity for transmitting in the first direction, and selecting the first technique for transmitting in the first direction to provide a traffic capacity which is more than the first estimate of the current required traffic capacity and less than the first estimate of the current maximal capacity for transmitting in the first direction.

According to some embodiments of the invention, selecting a first technique for transmitting in the first direction includes selecting a modulation for transmitting. According to some embodiments of the invention, selecting a first technique for transmitting in the first direction includes selecting an error coding for transmitting. According to some embodiments of the invention, selecting a first technique for transmitting in the first direction includes selecting a power level for transmitting.

According to some embodiments of the invention, the selecting includes selecting a first technique for transmitting in the first direction such that the first technique uses minimal acceptable transmission power while providing a traffic capacity which is more than the first estimate of the current required traffic capacity.

According to some embodiments of the invention, selecting a first technique for transmitting in the first direction includes selecting a frequency for transmitting which provides an acceptable level of interference with the same frequency being used on another wireless link based, at least in part, on having selected the first technique which provides a traffic capacity which is less than a maximum capacity possible in the first direction.

According to some embodiments of the invention, further including making an additional estimate of the current required traffic capacity for transmitting in the first direction, and making an additional selection of a technique for transmitting in the first direction, such that the technique for transmitting in the first direction provide more traffic capacity than the additional estimate of the current required traffic capacity.

According to some embodiments of the invention, further including making an additional estimate of the current maximal capacity for transmitting in the first direction, and making an additional selection of a technique for transmitting in the first direction to provide a traffic capacity which is more than the additional estimate of the current required traffic capacity and less than the additional estimate of the current maximal capacity for transmitting in the first direction.

According to some embodiments of the invention, additional estimates and additional selections are repeated every period of time.

According to some embodiments of the invention, the period of time is based, at least in part, on a time of day. According to some embodiments of the invention, the period of time is based, at least in part, on a day of week. According to some embodiments of the invention, the period of time is based, at least in part, on a season of year.

According to some embodiments of the invention, the technique for transmitting in the first direction includes an Adaptive Coding and Modulation (ACM) technique.

According to some embodiments of the invention, the wireless point-to-point link includes a single-carrier/continuous transmission wireless point-to-point link.

According to an aspect of some embodiments of the present invention there is provided a communication node for communicating via a wireless link including a capacity control unit configured to estimate required capacity for transmission, and providing an output indicating the required capacity estimate, a transmission selection unit configured to select a transmission technique for carrying the required capacity based, at least in part, on receiving the output of the required capacity estimate, and provide instructions for indicating what transmission technique is to be used for transmission, a transmitter configured for receiving data for transmission and the instructions for indicating what transmission technique is to be used for transmission, and for transmitting the data using the transmission technique.

According to some embodiments of the invention, the transmission selection unit is configured to select a transmission technique for carrying the required capacity which is less than a maximum capacity possible.

According to some embodiments of the invention, the transmission selection unit is further configured for receiving an indication about signal quality received from a second communication node which received the transmission of the communication node, and selecting a transmission technique based, at least in part, on providing a traffic capacity which is more than the required capacity estimate and less than the maximum capacity possible.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to the field of wireless communication and, more specifically but not exclusively, to point-to-point communication systems and, yet more specifically but not exclusively, to single carrier continuous transmission point-to-point communication systems.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As stated above, in the section titles "Summary of the invention", the present invention, in some embodiments thereof, includes modifying a transmit technique according to a required capacity in each direction of a point-to-point link, whether separately from or together with a currently known technique of optionally modifying with respect to channel conditions.

Choosing a transmit technique affects how much data can be carried over a link, affecting capacity of the link. Some non-limiting examples of transmission techniques include:
a transmission constellation;
a transmission coding;
a transmission modulation; and
a transmission power.

Another factor which affects how much data can be carried over a link is a receiver's sensitivity.

In prior art changing a transmission technique is usually used based on channel conditions. Since a wireless point-to-point link usually traverses the same path between the points, in the two different directions, the same transmission technique is usually used for the two different directions.

In some embodiments of the present invention, a different transmission technique is used for the two different directions in a point-to-point link. The transmission technique takes into account traffic requirements. Implementation of the above embodiments of the present invention may reduce sensitivity to interference, such as in links which require low capacity, and enable decreasing power and constellation in links which require low capacity, while still optionally increasing power and constellation in links which require higher capacity. An overall effect can be an increased total network capacity, and/or decreased interferences between neighboring channels, and/or decreased total network sensitivity to channel conditions, and/or a saving in total network power usage—a "green" improvement to prior art technology.

Figure 1A:
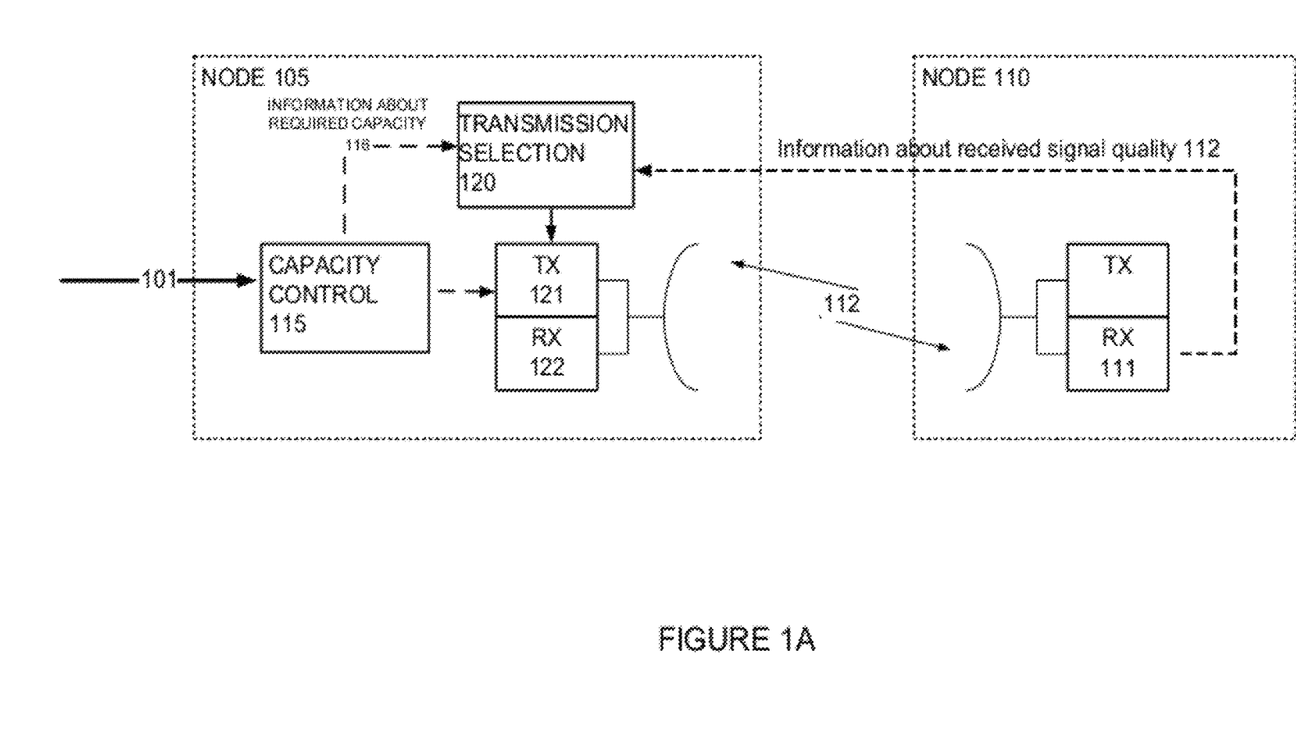
FIG. 1A is a simplified block diagram of a point-to-point communication system, constructed and operating according to an example embodiment of the invention.

Reference is now made to FIG. 1A, which is a simplified block diagram of a point-to-point communication system, constructed and operating according to an example embodiment of the invention.

FIG. 1A depicts a first communication node 105, communicating with a second communication node 110 over a wireless point-to-point link 112.

Data packets to be transmitted over the wireless point-to-point link 112 are input 101 to the first node 105, and input through a capacity control unit 115. The capacity control unit 115 dynamically monitors the input traffic, obtaining a current estimate of a required bit rate 116.

By way of a non-limiting example, the capacity control unit 115 may store packets in several queues according to their class. Data may be fetched from these queues for transmission according to predetermined priorities. The capacity control unit 115 optionally monitors the queues and the rate at which they are filled, obtaining an estimate of a required bit rate 116.

Information about the estimate of a required bit rate 116 is fed into a transmission selection unit 120, which instructs a transmission unit 121 which transmission technique to use for transmission.

In some embodiments of the invention, as depicted in FIG. 1A, the transmission selection unit 120 optionally makes decisions about the transmission technique also using information about signal quality of the received signal.

The second node 110 includes a receiver 111. The receiver 111 optionally provides information about received signal quality 113, which is sent from the receiving node 110 to the transmitting node 105 over the wireless point-to-point link 112, and is provided to the transmission selection unit 120. The information about received signal quality 113 provides an indication of the channel conditions, while the information about the estimate of a required bit rate 116 provides an indication of channel capacity required in the transmission direction depicted in FIG. 1A.

It is noted that the mechanism depicted in FIG. 1A may optionally, in some embodiments of the invention, be included for transmission in an opposite direction, from node 110 to node 105. This is not depicted in FIG. 1A, for sake of simplicity, and should be easily understood by a person skilled in the art.

As result of using an embodiment of the invention as depicted in FIG. 1A, a first communication node 105 may be found using a transmission technique for transmitting to the second communication node 110 different from a transmission technique which would be used in the prior art. The first communication node 105 may use a transmission technique which is selected taking into account a required capacity.

It is noted that embodiments of the invention are not limited to a system with queues, as described above with reference to the capacity control unit 115. The queues are only brought as an example for a method for determining a required bit rate and/or required link capacity. Different systems may have different ways for determining a required capacity.

Figure 1B:
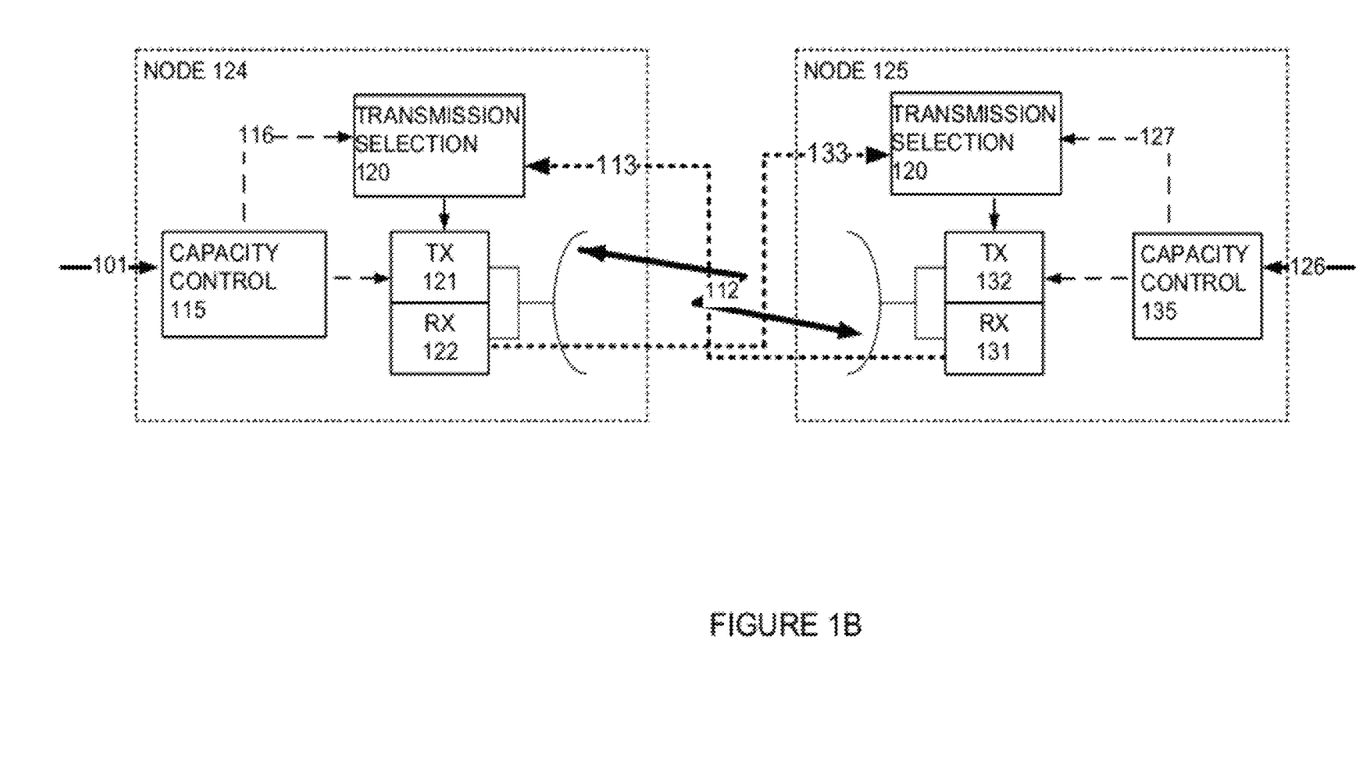
FIG. 1B is a simplified block diagram of a point-to-point communication system, constructed and operating according to another example embodiment of the invention.

Reference is now made to FIG. 1B which is a simplified block diagram of a point-to-point communication system, constructed and operating according to another example embodiment of the invention.

FIG. 1B depicts a first communication node 124, communicating with a second communication node 125 over a wireless point-to-point link 112.

Data packets to be transmitted over the wireless point-to-point link 112 are input 101 to the first node 124, and input through a capacity control unit 115. The capacity control unit 115 optionally monitors the input traffic, obtaining an estimate of a required bit rate 116.

Information about the estimate of the required bit rate 116 is fed into a transmission selection unit 120, which instructs a transmission unit 121 which transmission technique to use for transmission.

In some embodiments of the invention, as depicted in FIG. 1B, the transmission selection unit 120 optionally makes decisions about the transmission technique also using information about signal quality of the received signal.

The second node 125 includes a receiver 131. The receiver 131 optionally provides information about received signal quality 113, which is sent from the receiving node 125 to the first node 124 over the wireless point-to-point link 112, and is provided to the transmission selection unit 120. The information about received signal quality 113 provides an indication of the channel conditions, while the information about the estimate of a required bit rate 116 provides an indication of channel capacity required in the transmission direction from the first node 124 to the second node 125.

FIG. 1B also depicts the second communication node 125, communicating with the first communication node 124 over the wireless point-to-point link 112.

Data packets to be transmitted over the wireless point-to-point link 112 are input 126 to the second node 125, and input through a capacity control unit 135. The capacity control unit 135 optionally monitors the input 126 traffic, obtaining an estimate of a required bit rate 127.

Information about the estimate of the required bit rate 127 is fed into a transmission selection unit 120, which instructs a transmission unit 132 which transmission technique to use for transmission.

In some embodiments of the invention, as depicted in FIG. 1B, the transmission selection unit 120 optionally makes decisions about the transmission technique also using information about signal quality of the received signal.

The first node 124 includes a receiver 122. The receiver 122 optionally provides information about received signal quality 113, which is sent from the first node 124 to the second node 125 over the wireless point-to-point link 112, and is provided to the transmission selection unit 120. The information about received signal quality 133 provides an indication of the channel conditions, while the information about the estimate of a required bit rate 127 provides an indication of channel capacity required in the transmission direction from the second node 125 to the first node 124.

Estimating Required Capacity

Different possible coding-modulation pairs may be able to carry a different capacity, or bit rate. A bit rate supported by a system in a mode i is denoted herein by $b_i$. A required bit rate, or capacity, according to the capacity control unit 115, is denoted herein by c.

A current estimate of a required bit rate, such as the current estimate of a required bit rate 116 of FIG. 1A, optionally holds true for a period of time, so as not to require frequent changing of transmission technique, such as error coding or modulation.

A parameter $\alpha$ denotes a correction factor which is optionally taken into consideration in determining which bit rate is to be required.

In some embodiments of the invention the choice of a value for $\alpha$ is optionally made in order to have an amount of excess capacity, so that if the required capacity increases, the communication system has time to handle the increase without limiting capacity and/or without dropping data packets due to insufficient capacity. In some embodiments of the invention the amount of excess capacity is specified as a percentage of current capacity, such as 10% of current capacity, 20% of current capacity, 50% of current capacity, 100% of current capacity, 150% of current capacity.

In some embodiments of the invention the choice of a value for $\alpha$ is optionally made in order not to change transmission technique, or mode i too often. The parameter $\alpha$ should be chosen so that the mode i is not changed more often than every second, or every minute, or every several minutes, or even every hour.

The parameter $\alpha$ is optionally based on a wireless communication provider's profiling of traffic capacity over time. The parameter $\alpha$ is optionally chosen so that the mode i which is chosen provide a capacity which exceeds peaks of capacity at a given time period. The parameter $\alpha$ is optionally chosen taking into account the time of day, since required capacity typically changes with the time of day. The parameter $\alpha$ is optionally chosen taking into account the day of the week, since required capacity typically changes with the day of the week, at least over weekends.

In some embodiments of the invention, a transmission mode $b_i$ is chosen so that transmission uses minimal acceptable transmission power while still providing more than the current required traffic capacity.

A value $b_{max}$ denotes herein a maximal capacity, or bit rate, which may theoretically be supported by the system, taking into account channel conditions.

A parameter $\beta$ denotes herein a correction factor which is optionally taken into account when determining a practical maximal bit rate which can be supported. The parameter $\beta$ is selected so that the capacity of a mode $b_i$ does not exceed the maximum channel capacity $b_{max}$. The parameter $\beta$ should optionally be selected in order to prevent changing transmission technique, or mode i, too often. The parameter $\beta$ should be chosen so that the mode i is not changed more often than every second, or every minute, or every several minutes, or even every hour. The parameter $\beta$ is optionally based on a wireless communication provider's profiling of channel capacity over time. The parameter $\beta$ is optionally chosen so that the mode i which is chosen provide a capacity which does not exceed capacity during typical fading conditions at a given time period. The parameter $\beta$ is optionally chosen taking into account the season, since some seasons are more prone to atmospheric disturbances, such as rain. The parameter $\beta$ is optionally chosen taking into account the time of day, since in some seasons storms may occur at a same time of day, for example thunderstorms in the early afternoon. The parameter $\beta$ is optionally chosen taking into account a location, such as a geographical location and/or climatic location and/or microclimatic location of the wireless link, since some locations are more prone to atmospheric disturbances than others.

In some embodiments of the invention, the parameters $\alpha$ and/or $\beta$ are learned by the communication system over time. In some embodiments of the invention, the parameters $\alpha$ and/or $\beta$ are optimized by the communication system over time.

In the example application of FIG. 1A, parameters $\alpha$ and $\beta$ are assumed to be equal to or greater than 1.

A selected mode of operation $b_{selected}$ is optionally selected according to the following equation:

$$b_{selected} = \min\{b_i\}, \text{ such that } \alpha \cdot c < b_{selected} < \frac{b_{max}}{\beta} \quad \text{Equation 1}$$

$$\alpha, \beta \geq 1$$

If the practical maximal bit rate supported by a communication channel, which is $$\frac{b_{max}}{\beta},$$

is smaller than a required bit rate, which is $\alpha*c$, the network sub-system should drop low-priority packets in order to reduce the required bit rate—c.

It is emphasized that the maximal bit rate supported by the system—$b_{max}$, is determined with respect to a maximal transmit power. In other words, the system of the present example embodiment may optionally try to increase transmit power before switching a modulation to a lower one, for example due to bad channel conditions, and possibly cause a dropping of packets.

Figure 1C:
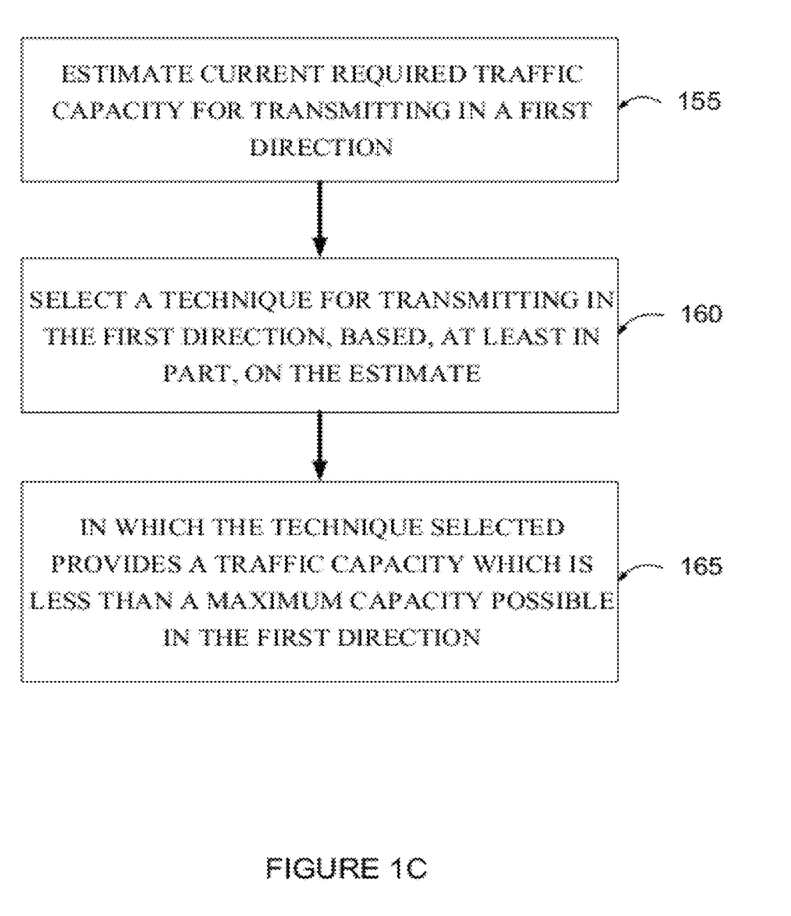
FIG. 1C is a simplified flow chart illustration of a method of managing transmitter settings in a wireless point-to-point link.

Reference is now made to FIG. 1C, which is a simplified flow chart illustration of a method of managing transmitter settings in a wireless point-to-point link.

The method of FIG. 1C includes:

making a first estimate of a current required traffic capacity for transmitting in a first direction, from a first point in the wireless point-to-point link to a second point (155);

selecting a first technique for transmitting in the first direction, based, at least in part, on the first estimate of the current required traffic capacity (160), in which the first technique selected provides a traffic capacity which is less than a maximum capacity possible in the first direction (165).

In some embodiments of the invention, a first estimate is made of a current maximal capacity for transmitting in the first direction, and the selection of the first technique for transmitting in the first direction is made so as to provide a traffic capacity which is more than the first estimate of the current required traffic capacity and less than the first estimate of the current maximal capacity for transmitting in the first direction.

The selection a technique for transmitting may be any of selecting a modulation for transmitting; selecting an error coding for transmitting; and selecting a power level for transmitting.

Embodiments of the present invention work independently on uplink (one direction) and downlink (an opposite direction) packets. When a required uplink bit rate is different from a required down-link bit rate, we may end up with a different modulation or coding for each. By selecting a minimal modulation, and/or a lower transmit power at each node according to the required capacity, a potential advantage is produced: interference between communication channels may be significantly lowered. Such a situation is described in more detail later, with reference to FIGS. 5A and 5B.

In some embodiments of the invention, the technique for transmitting comprises an Adaptive Coding and Modulation (ACM) technique.

Figure 2:
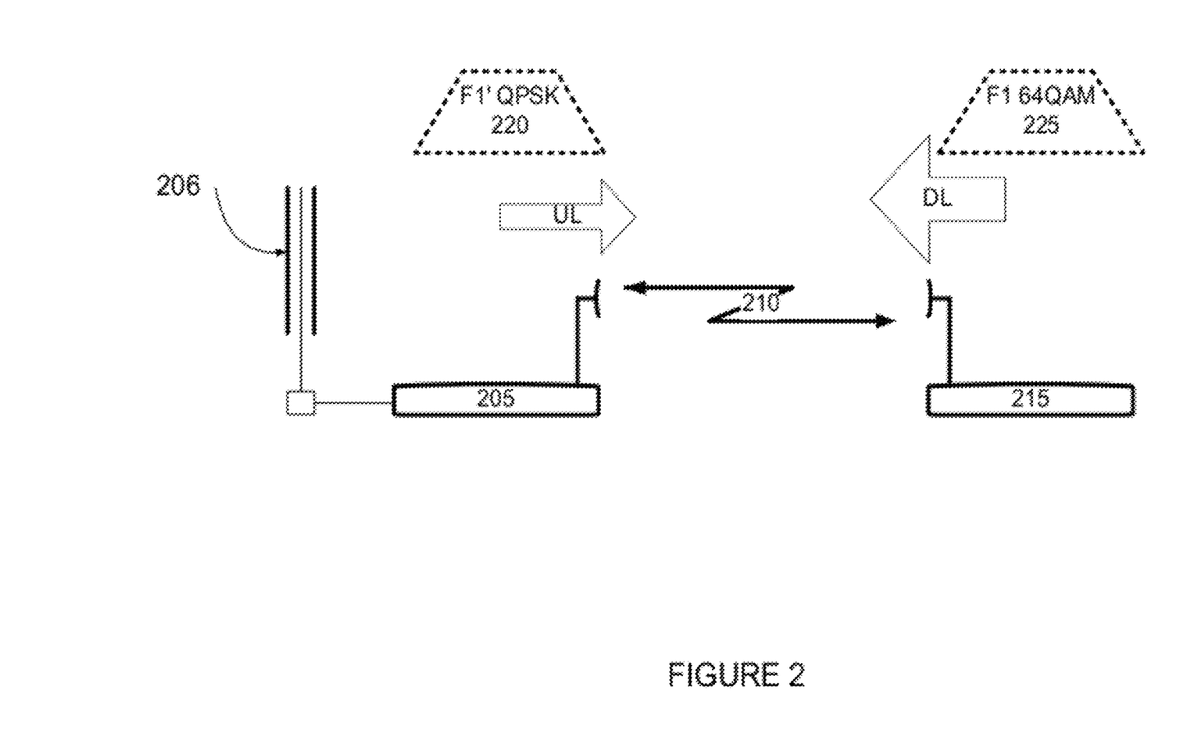
FIG. 2 is a simplified block diagram illustration of an asymmetric configuration of a point-to-point wireless link according to an embodiment of the present invention.

Reference is now made to FIG. 2, which is a simplified block diagram illustration of an asymmetric configuration of a point-to-point wireless link according to an embodiment of the present invention.

FIG. 2 depicts a first communication node 205, connected by a wireless link 210 to a second communication node 215. A downlink direction of communication, from the second node 215 to the first node 205, is configured to transmit at a frequency F1, using a 64 QAM modulation 225, while an uplink direction of communication, from the first node 205 to the second node 215, is configured to transmit at a frequency F1', using just a QPSK modulation 225.

By way of a non-limiting example, the first communication node 205 is a base station communicating by a base station antenna 206. As a base station, the first communication node 205 typically transmits in the uplink direction much less than it receives in the downlink direction.

Figure 3:
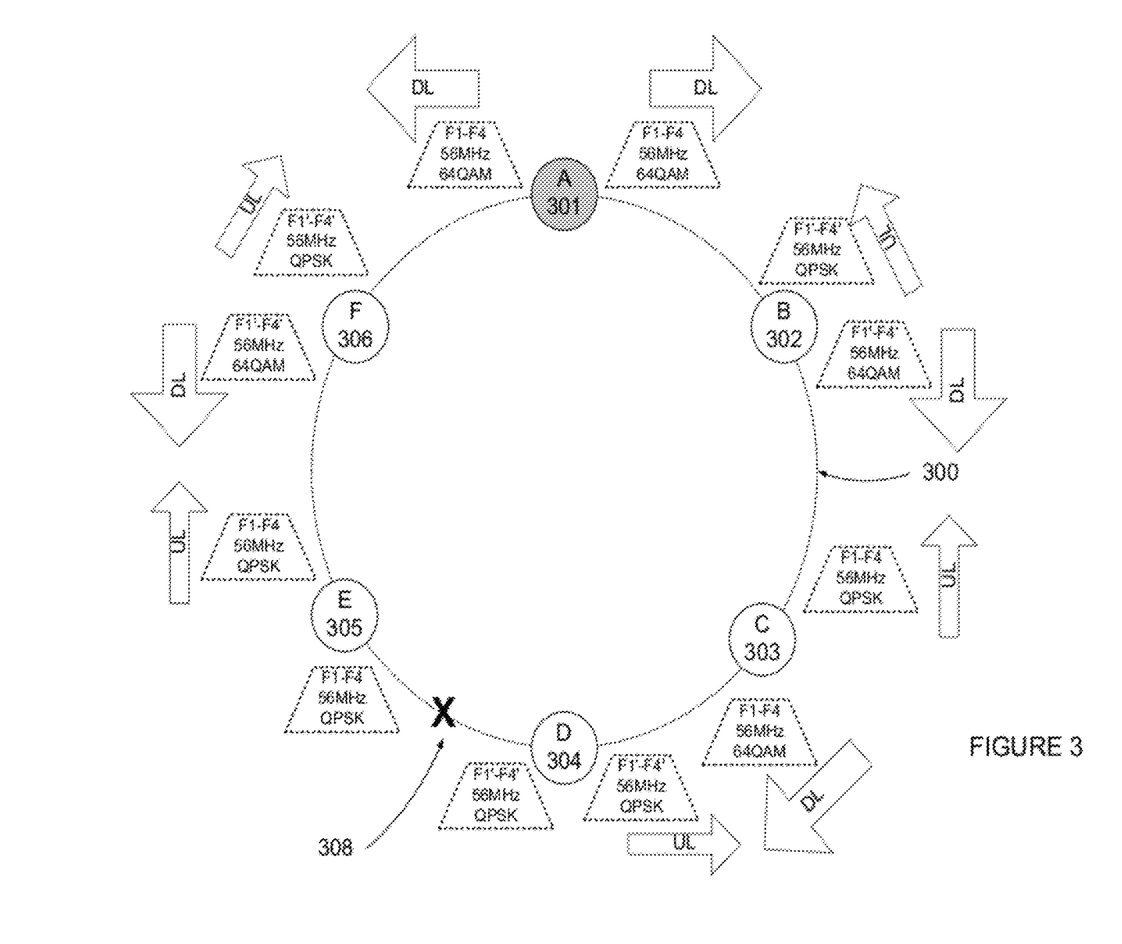
FIG. 3 is a simplified block diagram illustration of an example of a wireless communication network in which wireless links have been configured according to an embodiment of the present invention.

Reference is now made to FIG. 3, which is a simplified block diagram illustration of an example of a wireless communication network 300 in which wireless links have been configured according to an embodiment of the present invention.

FIG. 3 depicts a ring-topology network 300 including 6 communication nodes A 301, B 302, C 303, D 304, E 305, and F 306. The network 300 is allocated, by way of a non-limiting example, four frequency bands (F1, F2, F3 and F4) of 56 MHz each, for one direction of each link, and four frequency bands F1', F2', F3' and F4' of 56 MHz each, for transmitting in an opposite direction in each link. As typically done in packet networks, the ring topology may be cut by using a Spanning-Tree Protocol (STP). A cut position 308 is marked by an X in FIG. 3. The communication node A 301 in FIG. 3 denotes a main entry point to the ring. Traffic coming out of this node in the direction of the cut position 308 of the ring network 300 is termed downlink traffic. Traffic from other nodes toward node A is termed uplink traffic.

Since uplink traffic often requires less capacity than downlink traffic, FIG. 3 depicts the uplink traffic as transmitted using a QPSK modulation while the downlink traffic is transmitted using a 64-QAM modulation, according to an embodiment of the invention.

Optionally, transmission from the communication node D 304 toward the cut position 308, and from the communication node E 305 toward the cut position 308, is made using low-power and a lower-capacity modulation. The communication node D 304 does not send traffic to the cut position 308, and the communication node E 305 does not send traffic to the cut position 308, but the communication link is optionally kept alive. Optionally, idle packets are transmitted, and/or packets for determining if the link between the communication nodes D 304 and E 305 is available. There is no need for a high modulation over the link between the communication nodes D 304 and E 305.

In case of a failure in one of the ring links, the Spanning-Tree Protocol (STP) automatically causes a shift of the cutting point to the failed link. Modulation of the wireless links is caused to change accordingly.

Figure 4:
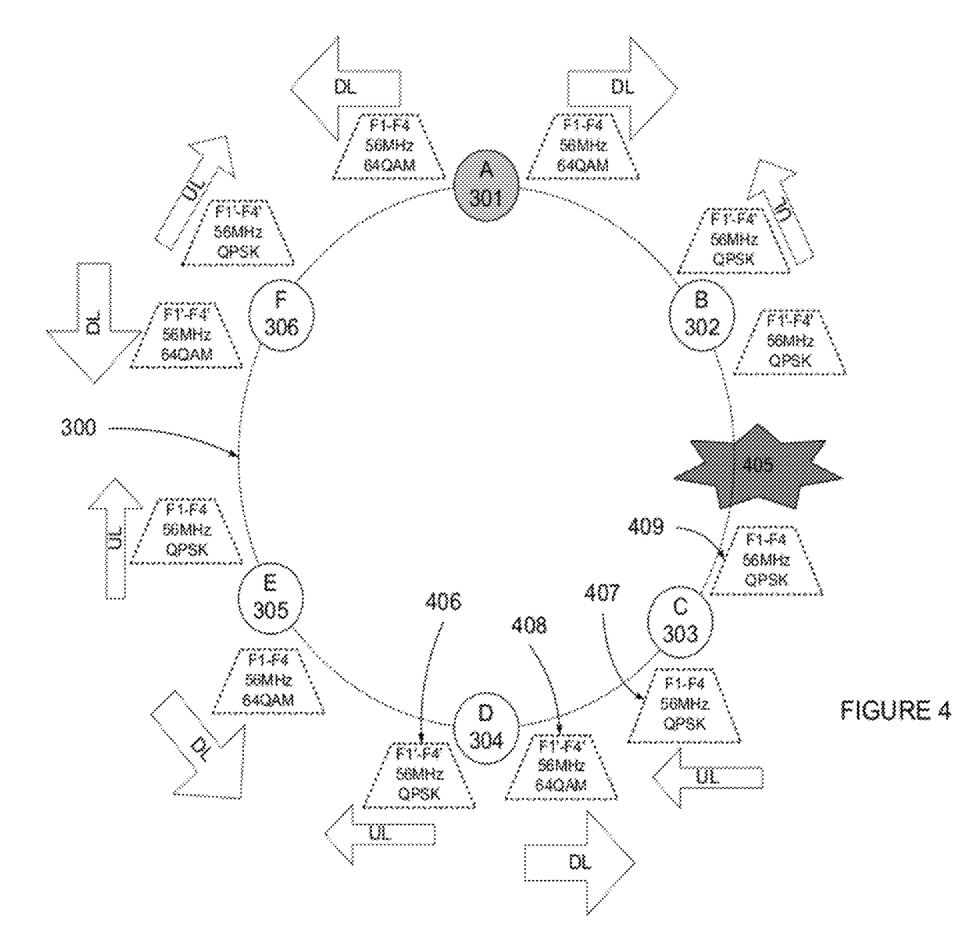
FIG. 4 is a simplified block diagram illustration of the wireless communication network of FIG. 3, in which a failure has occurred in one of the wireless links, and the transmission techniques have been re-configured according to an embodiment of the present invention.

Reference is now made to FIG. 4, which is a simplified block diagram illustration of the wireless communication network of FIG. 3, in which a failure has occurred in one of the wireless links, and the transmission techniques have been re-configured according to an embodiment of the present invention.

FIG. 4 depicts the ring-topology network 300 of FIG. 3, including the 6 communication nodes A 301, B 302, C 303, D 304, E 305, and F 306. The network 300 of FIG. 4 is also allocated, by way of a non-limiting example, the four frequency bands (F1, F2, F3 and F4) of 56 MHz each, for one direction of each link, and the four frequency bands F1', F2', F3' and F4' of 56 MHz each, for transmitting in an opposite direction in each link. The cut position 405 is re-positioned to the failed link, between node B 302 and node C 303.

Re-positioning the cut position 405 has caused the configuration of transmission from node C 303 to node D 304 to be changed to QPSK 407; and the configuration of transmission from node D 304 to node C 303 to be changed to 64QAM 408.

Optionally, transmission from the communication node C 303 toward the cut position 405, and from the communication node B 302 toward the cut position 405, is made using low-power and a lower-capacity modulation. The communication node C 303 does not send traffic to the cut position 405, and the communication node B 302 does not send traffic to the cut position 405, but the communication link is optionally tested, to determine when and if it becomes alive. Optionally, idle packets are transmitted, and/or packets for determining if the link between the communication nodes B 302 and C 303 is available. There is no need for a high modulation over the link between the communication nodes B 302 and C 303.

Frequency Reuse

Figure 5A:
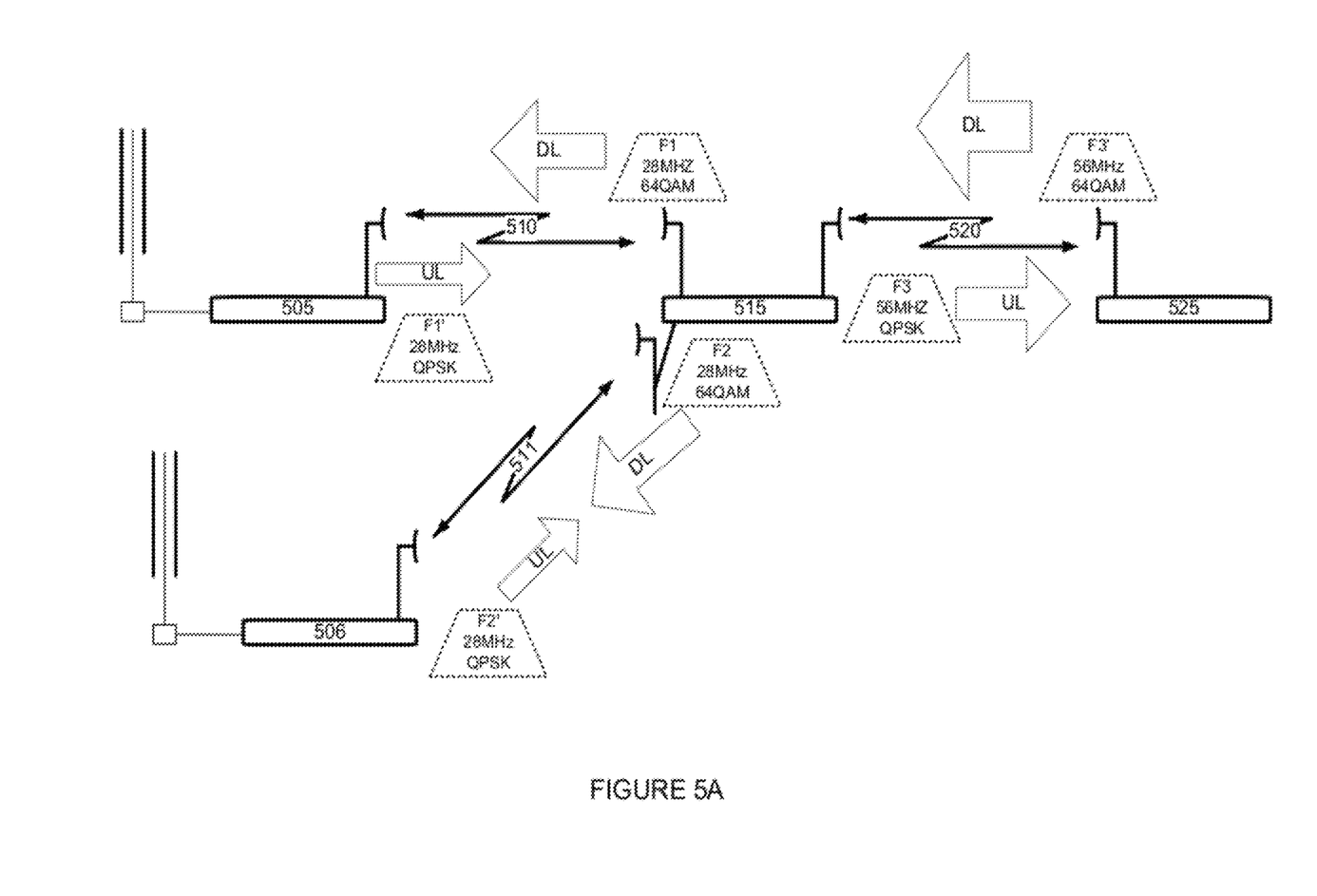
FIG. 5A is a simplified block diagram illustration of a section of a wireless network showing an aggregation node and two tail nodes, in which transmission techniques have been configured according to an example embodiment of the present invention.

Reference is now made to FIG. 5A, which is a simplified block diagram illustration of a section of a wireless network showing an aggregation node and two tail nodes, in which transmission techniques have been configured according to an example embodiment of the present invention.

FIG. 5A depicts, by way of a non-limiting example, two tail nodes 505 506, communicating uplink, via two wireless communication links 510 511, to an aggregation node 515. The aggregation node 515 communicates uplink with yet another communication node 525.

The communication node 525 communicates downlink with the aggregation node 515, which communicates downlink with the two tail nodes 505 506.

The tail nodes 505 506 require a downlink capacity which is higher than the uplink capacity. Therefore, a downlink modulation from the communication node 525 to the aggregation node 515, and from the aggregation node 515 to the tail nodes 505 506 is set to be 64 QAM, while communications in the uplink directions are set to be QPSK.

The frequencies used in the link to a first tail node 505 are F1 (downlink) and F1' (uplink). The frequencies used in the link to a second tail node 506 are F2 (downlink) and F2' (uplink).

Each one of the tail nodes 505 506 communicate with the aggregation node 515 using different frequencies, because the tail nodes 505 506 transmit from directions which appear substantially close when viewed from the aggregation node 515. If the frequencies were not different, there is a danger of substantial interference.

The aggregation node 515 communicates with communication node 525 using frequencies F3 and F3'.

The embodiment of the invention depicted in FIG. 5A provides the following potential advantages:

uplink traffic from the tail nodes 505 506 may be less error sensitive, since it is being transmitted using a less error sensitive modulation—QPSK; and less power may be used in transmitting from the tail nodes 505 506 to the aggregation node 515, since less traffic capacity is required.

Figure 5B:
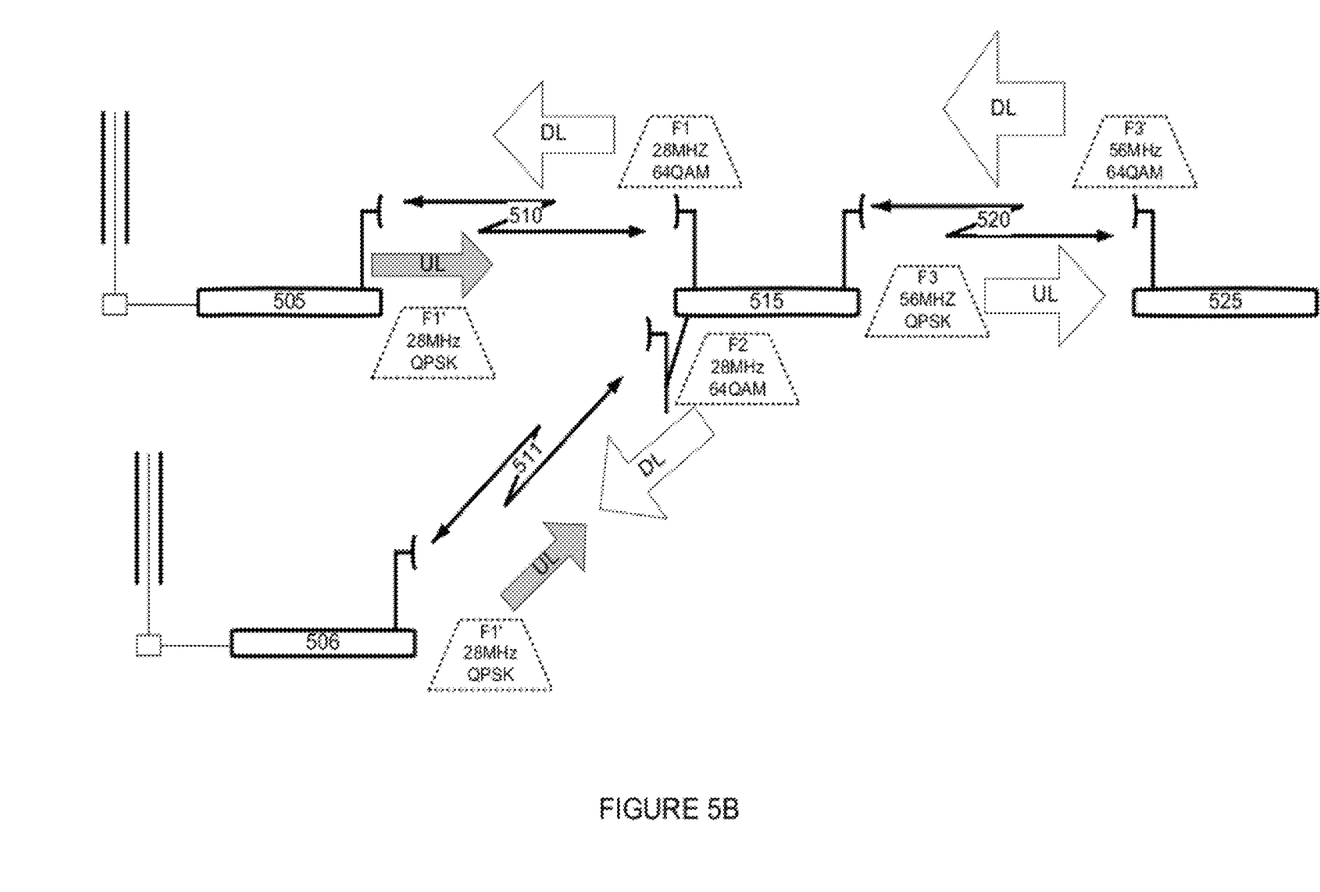
FIG. 5B is a simplified block diagram illustration of a section of a wireless network showing an aggregation node and two tail nodes, in which transmission techniques have been configured according to yet another example embodiment of the present invention.

Reference is now made to FIG. 5B, which is a simplified block diagram illustration of a section of a wireless network showing an aggregation node and two tail nodes, in which transmission techniques have been configured according to yet another example embodiment of the present invention; and FIG. 5B demonstrates re-use of an uplink frequency band allocated for two nearby communication nodes.

FIG. 5B depicts the same section of a wireless network as FIG. 5A, having two tail nodes 505 506, communicating uplink, via two wireless communication links 510 511, to an aggregation node 515. The aggregation node 515 communicates uplink with yet another communication node 525. The communication node 525 communicates downlink with the aggregation node 515, which communicates downlink with the two tail nodes 505 506.

The tail nodes 505 506 require a downlink capacity which is higher than the uplink capacity. Therefore, a downlink modulation from the communication node 525 to the aggregation node 515, and from the aggregation node 515 to the tail nodes 505 506 is set to be 64 QAM, while communications in the uplink directions are set to be QPSK.

The frequencies used in the link to a first tail node 505 are F1 (downlink) and F1' (uplink). The frequencies used in the link to a second tail node 506 are F2 (downlink) and F1' (uplink). It is noted that Both the tail nodes 505 506 communicate with the aggregation node 515 using the same frequency F1'. Using the same frequency is enabled in the network of FIG. 5B because a lower modulation is used (QPSK instead of 64QA, which is more resistant to errors, more resistant to interference.

Using an embodiment of the present invention enables using the same frequencies in some network geometries, such as geometries which under prior art use of transmission techniques would cause unacceptable high interference.

The network section depicted in FIG. 5B provides a potential saving of expense: it does not use, so does not need to pay for, the frequency F2' (which was used in the configuration of FIG. 5A), in the wireless link between the second tail node 506 and the aggregation node 515.

The aggregation node 515 communicates with communication node 525 using frequencies F3 and F3'.

The embodiment of the invention depicted in FIG. 5B provides the following potential advantages:

uplink traffic from the tail nodes 505 506 may optionally re-use frequency bands allocated for nearby communication nodes 505 506, since it is being transmitted using a less error sensitive modulation—QPSK, and possibly being transmitted using less power, so interference at a receiver node 515 is substantially diminished;

uplink traffic from the tail nodes 505 506 may be less error sensitive, since it is being transmitted using a less error sensitive modulation—QPSK; and less power may be used in transmitting from the tail nodes 505 506 to the aggregation node 515, since less traffic capacity is required.

The example provided above with reference to FIG. 5B teaches how to obtain use of frequency bands which could not be used by prior art techniques, also termed frequency reuse.

Figure 5C:
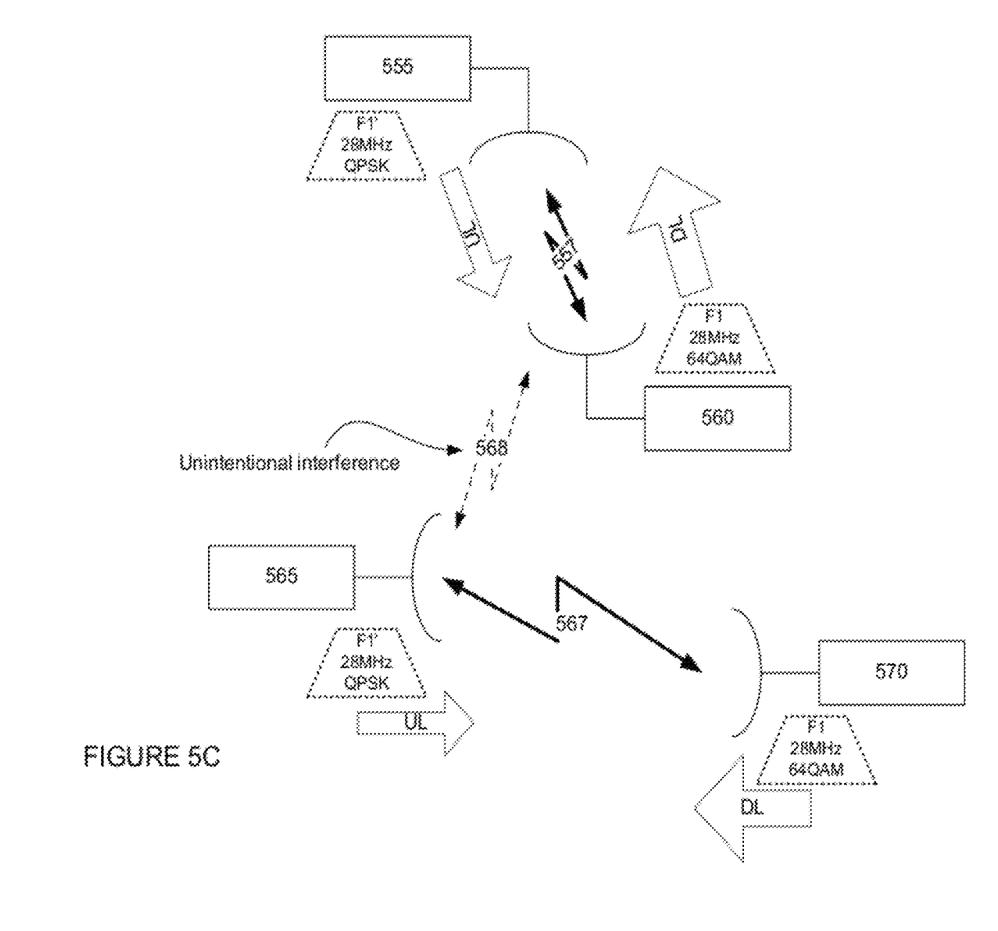
FIG. 5C is a simplified block diagram illustration of a section of a wireless network showing two wireless links between four communication nodes, in which transmission techniques have been configured according to yet another example embodiment of the present invention.

Reference is now made to FIG. 5C, which is a simplified block diagram illustration of a section of a wireless network showing two wireless links between four communication nodes, in which transmission techniques have been configured according to yet another example embodiment of the present invention.

FIG. 5C demonstrates re-use of both an uplink frequency band and a downlink frequency band allocated for two nearby communication nodes.

FIG. 5C depicts a first wireless link 557 between a first communication node 555 and a second communication node 560; and a second wireless link 567 between a third communication node 565 and a fourth communication node 570.

In the first wireless link 557, the first node 555 is downlink of the second node 560, that is, the first wireless link 557 requires a smaller traffic capacity for transmitting uplink to the second node 560 than is required for transmitting downlink from the second node 560 to the first node 555.

In the second wireless link 567, the third node 565 is downlink of the fourth node 570, that is, requires a smaller traffic capacity for transmitting uplink to the fourth node 570 than is required for transmitting downlink from the fourth node 570 to the third node 565.

In the example configuration depicted in FIG. 5C, there is a potential for unintentional interference 568 caused by the second node 560 receiving interference 568 from a transmission produced by the third node 565, and also in the opposite direction, caused by the third node 565 receiving interference 568 from a transmission produced by the second node 560. The potential for unintentional interference 568 may be caused by the geometry and/or topography of the network. Such situations are not rare in wireless point-to-point wireless link setups.

In prior art configurations, in order to preserve a reasonably low error rate the two wireless links 557 567 would each use different sets of frequencies, say F1 and F1' for the first wireless link 557, and F2 and F2' for the second wireless link 567.

However, using an example embodiment of the present invention, the two wireless links 557 567 optionally each use the same set of frequencies, say F1 and F1', nevertheless maintaining a reasonably low error rate.

The first node 555 and the third node 565 both transmit QPSK uplink in the same frequency—F1'. Because of the low modulation (QPSK) sensitivity to interference is low, and a receiver at the second node 560 can hear and understand, that is, receive a transmission from the first node 555 despite the interference 568 from the third node 565.

In the downlink direction two different transmitters, the transmitters of the second node 560 and the transmitter of the fourth node 570, both transmit a 64QAM signal, both at the same frequency F1.

The transmitter of the fourth node 570, in the example of FIG. 5C, does not cause interference with the receiver of the first node 555.

The transmitter of the second node 560 generates some unwanted interference 568 at the receiver of the third node 565, but the interference 568 can optionally be overcome by increasing the transmit power of the transmitter of the fourth node 570, so that the strength of the received signal from the transmitter of the fourth node 570 overpowers the unwanted interference 568 from the transmitter of the second node 560. The transmission power of the transmitter of the fourth node 570 is increased until a good Signal-to-Noise-Ratio is received at the receiver of the third node 565.

It is noted that the increase in power of the transmitter of the fourth node 570 typically occurs in communication systems with a transmit power control, since the fourth node 570 typically receives signal quality feedback from the third node 565, and typically increases power when the signal quality is low.

The network section depicted in FIG. 5C provides a potential saving of expense: it does not use, so does not need to pay for, the frequencies F2 and F2' which would be necessary under a prior art configuration.

The example provided above with reference to FIG. 5C teaches how to obtain re-use of frequency bands which could not be used by prior art techniques, also termed frequency reuse.

Communication in Fading Conditions

Figure 6:
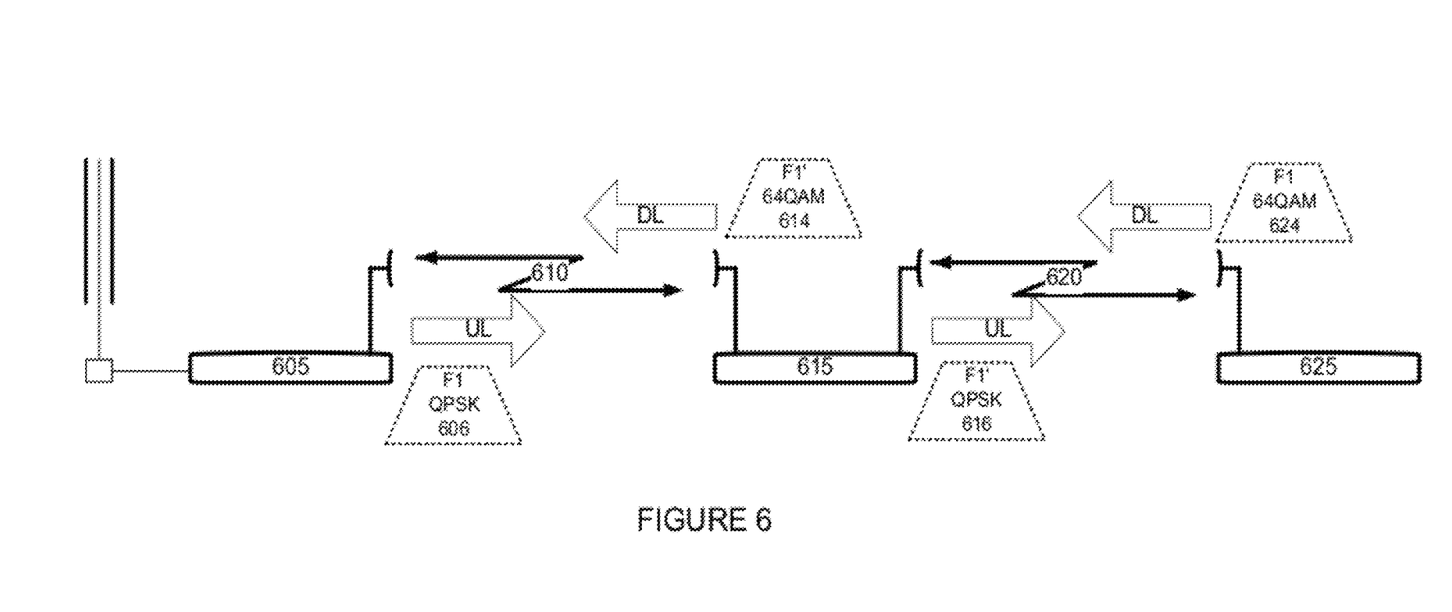
FIG. 6 is a simplified block diagram illustration of a section of a wireless network in which transmission techniques have been configured according to an embodiment of the present invention.

Reference is now made to FIG. 6, which is a simplified block diagram illustration of a section of a wireless network in which transmission techniques have been configured according to an embodiment of the present invention.

FIG. 6 depicts a section of a wireless network in which a first communication node 605 communicates over a first wireless link 610 to a second communication node 615, which communicates over a second wireless link 620 to a third communication node 625. An uplink direction of the section of the wireless network of FIG. 6 is from the first communication node 605 to a second communication node 615 to the third communication node 625.

In the first wireless link 610 a transmit mode F1 606 is used for transmitting from the first node 605 to the second node 615, and a transmit mode F1' 614 is used for transmitting from the second node 615 to the first node 605. In the second wireless link 620 a transmit mode F1' 616 is used for transmitting from the second node 615 to the third node 625, and a transmit mode F1 624 is used for transmitting from the third node 625 to the second node 615.

If transmission were managed using prior art techniques, when the first link 610 between the first node 605 and the second node 615 fades, a DL transmitter in the second node 615, according to prior art practice, optionally responds by increasing transmit power. As a result, interference to the first node 605 increases, since both the third node 625 and the first node 605 receive signals at the same frequency—F1'.

However, since the transmit modes of FIG. 6 are managed using an embodiment of the present invention, a QPSK modulation is optionally be defined for the uplink direction, making the uplink less sensitive to interference.

An embodiment of the present invention provides improved immunity to fading than prior art.

Automatic Coding and Modulation

It is noted that the allocation of a lower modulation, such as a QPSK modulation, to uplink traffic is optionally done automatically when there is a low demand for uplink capacity. The present invention, in some embodiments thereof, optionally allocates a modulation scheme dynamically as a function of changing capacity requirement as well as a function of changing channel conditions.

It is expected that during the life of a patent maturing from this application many relevant transmit techniques will be developed and the scope of the term transmit technique is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for managing transmission settings in a wireless point-to-point link, comprising:
    making a first estimate of a current required traffic capacity for transmitting in a first direction, from a first communication node in the wireless point-to-point link to a second communication node in the wireless point-to-point link;
    making a first estimate of a current maximal capacity for transmitting in the first direction; and
    selecting a first technique for transmitting in the first direction, based, at least in part, on the first estimate of the current required traffic capacity,
    in which the first technique selected provides a traffic capacity for transmitting in the first direction which is more than the first estimate of the current required traffic capacity and less than a maximum capacity possible in the first direction.

2. The method of claim 1 in which selecting a first technique for transmitting in the first direction comprises selecting a modulation for transmitting.

3. The method of claim 1 in which selecting a first technique for transmitting in the first direction comprises selecting an error coding for transmitting.

4. The method of claim 1 in which selecting a first technique for transmitting in the first direction comprises selecting a power level for transmitting.

5. The method of claim 4 in which said selecting comprises selecting a first technique for transmitting in the first direction such that said first technique uses minimal acceptable transmission power while providing a traffic capacity which is more than said first estimate of the current required traffic capacity.

6. The method of claim 1 in which selecting a first technique for transmitting in the first direction comprises selecting a frequency for transmitting which provides an acceptable level of interference with the same frequency being used on another wireless link based, at least in part, on having selected the first technique which provides a traffic capacity which is less than a maximum capacity possible in the first direction.

7. The method of claim 1, and further comprising:
    making an additional estimate of the current required traffic capacity for transmitting in the first direction; and
    making an additional selection of a technique for transmitting in the first direction, such that the technique for transmitting in the first direction provide more traffic capacity than the additional estimate of the current required traffic capacity.

8. The method of claim 7 in which additional estimates and additional selections are repeated every period of time.

9. The method of claim 8 in which the additional estimates and additional selections are repeated based, at least in part, on a time of day.

10. The method of claim 8 in which the additional estimates and additional selections are repeated based, at least in part, on a day of week.

11. The method of claim 8 in which the additional estimates and additional selections are repeated based, at least in part, on a season of year.

12. The method of claim 1, and further comprising:
    making an additional estimate of the current maximal capacity for transmitting in the first direction; and
    making an additional selection of a technique for transmitting in the first direction to provide a traffic capacity which is more than the additional estimate of the current required traffic capacity and less than the additional estimate of the current maximal capacity for transmitting in the first direction.

13. The method of claim 1 in which the technique for transmitting in the first direction comprises an Adaptive Coding and Modulation (ACM) technique.

14. The method of claim 1 in which the wireless point-to-point link comprises a single-carrier/continuous transmission wireless point-to-point link.

15. The method of claim 1 wherein the first technique selected is different from a technique selected for transmitting in a second, opposite direction, from the second node of the wireless point-to-point link to the first node of the wireless point-to-point link.

16. A communication node for communicating via a wireless point-to-point link comprising:
    a capacity control unit configured to estimate required capacity for transmission over the wireless point-to-point link in a first direction, from the communication node to a second communication node, making a first estimate of a current maximal capacity for transmitting in the first direction, and providing an output indicating the required capacity and the maximal capacity estimate;
    a transmission selection unit configured to select a transmission technique for carrying the required capacity based, at least in part, on receiving the output of the required capacity estimate, and provide instructions for indicating what transmission technique is to be used for transmission in the first direction;
    a transmitter configured for receiving data for transmission and the instructions for indicating what transmission technique is to be used for transmission, and for transmitting the data over the wireless point-to-point link in the first direction using the transmission technique,
    wherein the transmission selection unit is configured to select a transmission technique for carrying the required capacity which is more than the first estimate of the required traffic capacity and less than the maximal capacity estimate.

17. The communication node of claim 16, in which the transmission selection unit is further configured for:
    receiving an indication about signal quality received from the second communication node which received the transmission of the communication node; and selecting a transmission technique based, at least in part, on providing a traffic capacity which is more than the required capacity estimate and less than the maximum capacity possible.

18. The communication node of claim 16, wherein the transmission selection unit is configured for selecting a transmission technique for carrying the required capacity in the first direction regardless of a transmission technique used by the communication node to receive in a second, opposite direction, from the second communication node of the wireless point-to-point link to the communication node of the wireless point-to-point link.

* * * * *